(12) United States Patent
Pagryzinski et al.

(10) Patent No.: US 8,585,956 B1
(45) Date of Patent: Nov. 19, 2013

(54) SYSTEMS AND METHODS FOR LASER MARKING WORK PIECES

(75) Inventors: William V. Pagryzinski, Leo, IN (US); Caleb A. Ziebold, Defiance, OH (US)

(73) Assignee: Therma-Tru, Inc., Edgerton, OH (US)

( * ) Notice: Subject to any disclaimer, the term of this patent is extended or adjusted under 35 U.S.C. 154(b) by 119 days.

(21) Appl. No.: 12/911,336

(22) Filed: Oct. 25, 2010

Related U.S. Application Data

(60) Provisional application No. 61/254,453, filed on Oct. 23, 2009.

(51) Int. Cl.
*B29C 35/08* (2006.01)

(52) U.S. Cl.
USPC .......................................... 264/400

(58) Field of Classification Search
USPC .......................................... 264/400
See application file for complete search history.

(56) References Cited

U.S. PATENT DOCUMENTS

| | | | |
|---|---|---|---|
| 3,506,779 A | 4/1970 | Brown et al. |
| 3,584,183 A | 6/1971 | Chiaretta et al. |
| 3,619,037 A | 11/1971 | Pugh, Jr. |
| 3,626,141 A | 12/1971 | Daly |
| 3,636,251 A | 1/1972 | Daly et al. |
| 3,745,586 A | 7/1973 | Brandy |
| 3,920,951 A | 11/1975 | Chovan et al. |
| 4,046,986 A | 9/1977 | Barker |
| 4,054,094 A | 10/1977 | Caddell et al. |
| 4,126,500 A | 11/1978 | Palanos |
| 4,128,752 A | 12/1978 | Gravel |
| 4,139,409 A | 2/1979 | Macken et al. |
| 4,143,261 A | 3/1979 | Eckart |
| 4,156,124 A | 5/1979 | Macken et al. |
| 4,276,829 A | 7/1981 | Chen |
| 4,336,439 A | 6/1982 | Sasnett et al. |
| 4,354,196 A | 10/1982 | Neumann et al. |
| 4,390,903 A | 6/1983 | Pomeroy |
| 4,446,165 A | 5/1984 | Roberts |
| 4,468,551 A | 8/1984 | Neiheisel |

(Continued)

FOREIGN PATENT DOCUMENTS

| | | |
|---|---|---|
| DE | 4300378 | 7/1993 |
| EP | 213546 | 1/1991 |

(Continued)

OTHER PUBLICATIONS

The Engravers Journal, vol. 19, No. 2, Sep. 1993, 18 pgs.

(Continued)

*Primary Examiner* — Larry Thrower
(74) *Attorney, Agent, or Firm* — Calfee, Halter & Griswold LLP

(57) ABSTRACT

A method of laser marking a work piece involves reproducing a pattern having a surface marked portion and a depth engraved portion from a digital image of the pattern. The grayscale shades of pixels in one portion of the image are adjusted while maintaining grayscale shades of pixels in the other portions of the image constant, wherein the adjusted grayscale shades of pixels corresponding to a surface marked portion are within a first range and the adjusted grayscale shades of pixels corresponding to a depth engraved portion are within a second range separate from the first range. The modified image is converted to a computer readable code, such that the first and second ranges of grayscale shades are associated with surface marking and depth engraving ranges of laser power settings. A laser marking apparatus is then operated in accordance with the computer readable code to laser mark the work piece.

28 Claims, 15 Drawing Sheets

(56) References Cited

U.S. PATENT DOCUMENTS

| | | |
|---|---|---|
| 4,480,169 A | 10/1984 | Macken |
| 4,507,536 A | 3/1985 | Inoue |
| 4,520,370 A | 5/1985 | Fujii et al. |
| 4,535,218 A | 8/1985 | Krause et al. |
| 4,564,739 A | 1/1986 | Mattelin |
| 4,596,409 A | 6/1986 | Holbein et al. |
| 4,629,858 A | 12/1986 | Kyle |
| 4,733,660 A | 3/1988 | Itzkan |
| 4,797,300 A | 1/1989 | Jandacek et al. |
| 4,799,767 A | 1/1989 | Woodruff |
| 4,803,021 A | 2/1989 | Werth et al. |
| 4,847,184 A | 7/1989 | Taniguchi et al. |
| 4,861,620 A | 8/1989 | Azuma et al. |
| 4,933,689 A | 6/1990 | Yoknis |
| 4,941,093 A | 7/1990 | Marshall et al. |
| 4,964,967 A | 10/1990 | Hashimoto et al. |
| 4,970,600 A | 11/1990 | Garnier et al. |
| 4,972,323 A | 11/1990 | Cauwet |
| 4,992,347 A | 2/1991 | Hawkins et al. |
| 5,017,423 A | 5/1991 | Bossmann et al. |
| 5,079,563 A | 1/1992 | Starkweather et al. |
| 5,118,917 A | 6/1992 | Van Krieken et al. |
| 5,122,659 A | 6/1992 | Agano |
| 5,126,531 A | 6/1992 | Majima et al. |
| 5,182,055 A | 1/1993 | Allison et al. |
| 5,190,791 A | 3/1993 | Gunter et al. |
| 5,200,592 A | 4/1993 | Yabu |
| 5,225,650 A | 7/1993 | Babel et al. |
| 5,236,545 A | 8/1993 | Pryor |
| 5,240,748 A | 8/1993 | Van Esdonk et al. |
| 5,247,883 A | 9/1993 | Kuwahara et al. |
| 5,259,311 A | 11/1993 | McCaughey |
| 5,262,612 A | 11/1993 | Momany et al. |
| 5,288,805 A | 2/1994 | Kodali |
| 5,294,293 A | 3/1994 | Jones |
| 5,298,717 A | 3/1994 | DeRossett, Jr. |
| 5,324,912 A | 6/1994 | Boppel et al. |
| 5,327,625 A | 7/1994 | Clark, Jr. et al. |
| 5,351,399 A | 10/1994 | Neuhoffer et al. |
| 5,376,770 A | 12/1994 | Kuhl et al. |
| 5,382,773 A | 1/1995 | Kurihara et al. |
| 5,410,335 A | 4/1995 | Sawano et al. |
| 5,413,814 A | 5/1995 | Bowen et al. |
| 5,453,339 A | 9/1995 | Frost et al. |
| 5,478,426 A | 12/1995 | Wiler et al. |
| 5,480,750 A | 1/1996 | Kawada et al. |
| 5,504,303 A | 4/1996 | Nagy |
| 5,567,207 A | 10/1996 | Lockman et al. |
| 5,580,410 A | 12/1996 | Johnston |
| 5,585,018 A | 12/1996 | Kanaoka et al. |
| 5,637,244 A | 6/1997 | Erokhin |
| 5,660,747 A | 8/1997 | Drouillard et al. |
| 5,665,520 A | 9/1997 | Yoshioka et al. |
| 5,674,591 A | 10/1997 | James et al. |
| 5,686,211 A | 11/1997 | Motegi et al. |
| 5,699,589 A | 12/1997 | Ripley et al. |
| 5,728,994 A | 3/1998 | Hutton |
| 5,759,473 A | 6/1998 | Minke et al. |
| 5,798,202 A | 8/1998 | Cushner et al. |
| 5,804,353 A | 9/1998 | Cushner et al. |
| 5,817,243 A | 10/1998 | Shaffer |
| 5,827,597 A | 10/1998 | James et al. |
| 5,880,430 A | 3/1999 | Wein |
| 5,893,987 A | 4/1999 | Yamazaki et al. |
| 5,904,965 A | 5/1999 | Noel et al. |
| 5,916,461 A | 6/1999 | Costin et al. |
| 5,990,444 A | 11/1999 | Costin |
| 6,002,099 A | 12/1999 | Martin et al. |
| 6,140,602 A | 10/2000 | Costin |
| 6,178,413 B1 | 1/2001 | Costin |
| 6,221,450 B1 | 4/2001 | Noel et al. |
| 6,221,451 B1 | 4/2001 | Lauer et al. |
| 6,252,196 B1 | 6/2001 | Costin et al. |
| 6,315,202 B2 | 11/2001 | Costin et al. |
| 6,358,614 B1 | 3/2002 | Porter |
| 6,424,670 B1 | 7/2002 | Sukhman et al. |
| 6,489,985 B1 | 12/2002 | Brodsky et al. |
| 6,495,237 B1 | 12/2002 | Costin |
| 6,528,758 B2 | 3/2003 | Shaffer |
| 6,544,634 B1 | 4/2003 | Abrams et al. |
| 6,559,410 B2 | 5/2003 | Bowker et al. |
| 6,576,862 B1 | 6/2003 | Costin et al. |
| 6,616,710 B1 | 9/2003 | Costin et al. |
| 6,616,997 B1 | 9/2003 | Lauer et al. |
| 6,649,245 B2 | 11/2003 | Lenderink |
| 6,664,505 B2 | 12/2003 | Martin |
| 6,685,868 B2 | 2/2004 | Costin |
| 6,722,001 B2 | 4/2004 | Baker |
| 6,752,941 B2 | 6/2004 | Hills |
| 6,753,501 B1 | 6/2004 | Costin, Sr. et al. |
| 6,777,643 B2 | 8/2004 | Bowker et al. |
| 6,807,456 B1 | 10/2004 | Costin, Jr. et al. |
| 6,819,972 B1 | 11/2004 | Martin et al. |
| 6,834,846 B2 | 12/2004 | Robbins, III |
| 6,858,815 B1 | 2/2005 | Costin |
| 6,881,924 B2 | 4/2005 | Lai |
| 6,911,171 B2 | 6/2005 | Laurer |
| 7,034,248 B2 | 4/2006 | Crouse, Jr. et al. |
| 7,126,082 B2 | 10/2006 | Lundberg |
| 7,166,249 B2 | 1/2007 | Abrams et al. |
| 7,188,774 B2 | 3/2007 | Pinchen et al. |
| 7,245,207 B1 | 7/2007 | Dayan et al. |
| 7,261,564 B2 | 8/2007 | Sutula, Jr. |
| 7,308,740 B2 | 12/2007 | Roberts |
| 7,357,959 B2 | 4/2008 | Bauer |
| 7,367,759 B2 | 5/2008 | Kozlowski |
| 7,414,221 B2 | 8/2008 | Pratt, Sr. et al. |
| 7,462,308 B2 | 12/2008 | Hills |
| 7,485,237 B2 | 2/2009 | Guyun et al. |
| 7,494,057 B2 | 2/2009 | Lasch et al. |
| 7,501,601 B2 | 3/2009 | Lundberg |
| 7,513,072 B2 | 4/2009 | Karlsson |
| 7,530,491 B2 | 5/2009 | Lasch et al. |
| 7,540,421 B2 | 6/2009 | Pinchen et al. |
| 7,563,340 B2 | 7/2009 | Peterson |
| 7,588,184 B2 | 9/2009 | Gandel et al. |
| 7,614,748 B2 | 11/2009 | Nayar et al. |
| 7,633,033 B2 | 12/2009 | Thomas et al. |
| 7,649,154 B2 | 1/2010 | Ripperger et al. |
| 7,691,281 B2 | 4/2010 | Collier |
| 7,699,896 B1 | 4/2010 | Colwell |
| 7,717,035 B1 | 5/2010 | Gray |
| 7,771,605 B2 | 8/2010 | Karapatis |
| 7,793,393 B2 | 9/2010 | Roberts |
| 7,800,014 B2 | 9/2010 | Thomas et al. |
| 7,819,310 B2 | 10/2010 | Lasch et al. |
| 7,820,940 B2 | 10/2010 | Lin et al. |
| 7,823,777 B2 | 11/2010 | Varga et al. |
| 7,891,815 B2 | 2/2011 | Nayar et al. |
| 7,910,854 B2 | 3/2011 | Besson et al. |
| 7,919,191 B2 | 4/2011 | Arnold |
| 2001/0011682 A1 | 8/2001 | Costin et al. |
| 2001/0025835 A1 | 10/2001 | Costin, Jr. |
| 2002/0179580 A1 | 12/2002 | Costin |
| 2003/0047253 A1 | 3/2003 | Robinson et al. |
| 2003/0057609 A1 | 3/2003 | Ratcliffe |
| 2003/0102290 A1 | 6/2003 | Shaffer |
| 2003/0161985 A1 | 8/2003 | Lauer |
| 2004/0045240 A1 | 3/2004 | McIlvaine |
| 2004/0128932 A1 | 7/2004 | Estape |
| 2004/0173786 A1 | 9/2004 | Robbins |
| 2004/0229015 A1 | 11/2004 | Gibbs, I et al. |
| 2004/0232581 A1 | 11/2004 | Hills |
| 2005/0006019 A1 | 1/2005 | Ratcliffe |
| 2005/0006035 A1 | 1/2005 | Lai |
| 2005/0006357 A1 | 1/2005 | Connor |
| 2005/0016955 A1 | 1/2005 | DeRossett, Jr. et al. |
| 2005/0083551 A1 | 4/2005 | McIlvaine |
| 2005/0095408 A1 | 5/2005 | LaBrec et al. |
| 2005/0131571 A1 | 6/2005 | Costin |
| 2005/0155500 A1 | 7/2005 | Latos et al. |
| 2005/0167408 A1 | 8/2005 | Gaiotti |
| 2006/0006132 A1 | 1/2006 | Lauer |
| 2006/0011576 A1 | 1/2006 | Guynn et al. |

(56) References Cited

U.S. PATENT DOCUMENTS

| | | |
|---|---|---|
| 2006/0020251 A1 | 1/2006 | Kelly |
| 2007/0034613 A1 | 2/2007 | Lundberg |
| 2007/0035777 A1 | 2/2007 | Kintner |
| 2007/0079928 A1 | 4/2007 | Abrams |
| 2007/0099699 A1 | 5/2007 | Plotkin |
| 2007/0108170 A1 | 5/2007 | Costin, Sr. et al. |
| 2007/0129841 A1 | 6/2007 | Colico et al. |
| 2007/0141328 A1 | 6/2007 | Kamiyama |
| 2007/0175857 A1 | 8/2007 | Boone |
| 2007/0181544 A1 | 8/2007 | Sukhman et al. |
| 2007/0191802 A1 | 8/2007 | Gubernick |
| 2007/0200001 A1 | 8/2007 | Pinchen et al. |
| 2007/0207333 A1 | 9/2007 | Surber |
| 2007/0221344 A1 | 9/2007 | Beach |
| 2007/0251929 A1 | 11/2007 | Sukhman et al. |
| 2007/0283601 A1 | 12/2007 | Peterson |
| 2007/0289180 A1 | 12/2007 | Johnson |
| 2008/0079304 A1 | 4/2008 | Isaac |
| 2008/0156778 A1 | 7/2008 | Lin et al. |
| 2008/0185365 A1 | 8/2008 | Yang et al. |
| 2008/0187710 A1 | 8/2008 | Stanchfield et al. |
| 2008/0200843 A1 | 8/2008 | Williams et al. |
| 2008/0223834 A1 | 9/2008 | Griffiths et al. |
| 2008/0241478 A1 | 10/2008 | Costin et al. |
| 2009/0007933 A1 | 1/2009 | Thomas et al. |
| 2009/0025123 A1 | 1/2009 | Weedlun et al. |
| 2009/0065324 A1 | 3/2009 | Axler et al. |
| 2009/0071941 A1 | 3/2009 | Knoblauch et al. |
| 2009/0075037 A1 | 3/2009 | Garitano |
| 2009/0121853 A1 | 5/2009 | Eich et al. |
| 2009/0266804 A1 | 10/2009 | Costin et al. |
| 2009/0280290 A1 | 11/2009 | Weedlun |
| 2009/0294543 A1 | 12/2009 | Varga et al. |
| 2009/0326689 A1 | 12/2009 | Allard |
| 2010/0006546 A1 | 1/2010 | Young et al. |
| 2010/0007045 A1 | 1/2010 | Hsu et al. |
| 2010/0020555 A1 | 1/2010 | Bedard et al. |
| 2010/0038273 A1 | 2/2010 | Johnson |
| 2010/0040836 A1 | 2/2010 | Li et al. |
| 2010/0043314 A1 | 2/2010 | Ruggie et al. |
| 2010/0044357 A1 | 2/2010 | Thomas et al. |
| 2010/0047536 A1 | 2/2010 | Del Mundo et al. |
| 2010/0104697 A1 | 4/2010 | Kriegel et al. |
| 2010/0176101 A1 | 7/2010 | Costin et al. |
| 2010/0178445 A1 | 7/2010 | Shen et al. |
| 2010/0183822 A1 | 7/2010 | Ruggie et al. |
| 2010/0272961 A1 | 10/2010 | Costin, Jr. |
| 2010/0308061 A1 | 12/2010 | Loulourgas |
| 2010/0320180 A1 | 12/2010 | Gates |
| 2011/0000898 A1 | 1/2011 | Rumsby |
| 2011/0037762 A1 | 2/2011 | Elber |
| 2011/0039038 A1 | 2/2011 | Ronsin et al. |
| 2011/0049114 A1 | 3/2011 | Barkhausen et al. |
| 2011/0049766 A1 | 3/2011 | DelMundo et al. |
| 2011/0056638 A1 | 3/2011 | Rosset |
| 2011/0069276 A1 | 3/2011 | Tucker et al. |

FOREIGN PATENT DOCUMENTS

| | | |
|---|---|---|
| EP | 322258 | 5/1993 |
| EP | 669298 | 8/1995 |
| EP | 1068958 | 1/2001 |
| EP | 1123772 | 12/2006 |
| GB | 2294656 | 5/1996 |
| JP | 61-242783 | 10/1986 |
| JP | 61-262717 | 11/1986 |
| JP | 62-050231 | 3/1987 |
| JP | 4-016268 | 1/1992 |
| JP | 6-002265 | 1/1994 |
| JP | 6-087234 | 3/1994 |
| WO | 95/20253 | 7/1995 |
| WO | 95/31584 | 11/1995 |
| WO | 97/16279 | 5/1997 |
| WO | 98/47657 | 10/1998 |
| WO | 2006/031169 | 3/2006 |
| WO | 2007/061459 | 5/2007 |
| WO | 2008/156620 | 12/2008 |
| WO | 2009/131708 | 10/2009 |
| WO | 2010/021912 | 2/2010 |
| WO | 2010/022134 | 2/2010 |

OTHER PUBLICATIONS

Oldershaw, G.A., "Excimer laser ablation of polyethylene terephthalate. Prediction of threshold fluences from thermolysis rates", Chemical Physics Letters, vol. 186, issue 1, pp. 23-26, Nov. 1, 1991. Abstract Only.

Sumiyoshi, et al., "A high perforation ability of TEA CO2 laser for PEEK ablation", Lasers and Electro-Optics Society Annual Meeting, 1993. LEOS '93 conference Proceedings. IEEE. Abstract Only.

Tsunemi, et al., "High speed cleaning of slid surface by high-repetition rated pulses from a TEA CO2 laser", May 25, 1994, Institute of Physical and Chemical Research and Dept. of Physics, Science University of Tokyo, Abstract Only.

Braren et al., "Ablation of Polymers with Pairs of Ultraviolet Laser Pulses with Controlled Temporal Separation", Mater. Res. Soc. Symp., Proc. vol. 129, pp. 405-410, 1989.

Cavanagh et al., "Dynamics of Nonthermal Reactions Femtosecond Surface Chemistry", J. Phys. Chem. vol. 97, pp. 786-798, 1993.

Crater, "Laser Marked Codes for Paperless Tracking Applications", SPIE, vol. 744, Lasers in Motion for INdustrial Applications, pp. 181-184, 1987.

Dunn, "Economics of Energy Sources for Graphic Arts Imaging", SPIE, vol. 169, Laser Printing, pp. 100-104, 1979.

Eberl, et al., "New Developments in the LASERCAV Technology", ICALEO '91, Laser Materials Processing, Nov. 3-8, 1991, SPIE vol. 1722, pp. 1-14.

Gu, B., "Review—40 Years of Laser Marking—Industrial Applications", Proc. of SPIE, vol. 6016, pp. 1-1-1-7, 2006.

Herziger et al., "Trends in materials processing with laser radiation", SPIE vol. 1022, Laser Assisted Processing, pp. 2-18, 1988.

Hofmann, et al., "High Contrast and Intact Surface—a Challenge in Laser Marking of Plastics", SPIE, vol. 744, Lasers in Motion for Industrial Applications, pp. 156-180, 1987.

Jundt et al., "Microscopic material interactions by laser engraving", SPIE, vol. 744, Lasers in Motion for Industrial Applications, pp. 147-155, 1987.

Kessler, "Lasers in Reprographics: A Market Summary", SPIE, vol. 169, Laser Printing, pp. 29-33, 1979.

Klimt, B.H., "State of the Art in Laser Marking and Engraving", SPIE, vol. 744, Lasers in Motion for Industrial Applications, pp. 185-189, 1987.

Landsman, R.M., "Design and Use of Thermal Imaging Systems for the Graphic Arts", SPIE, vol. 169, Laser Printing, pp. 71-77, 1979.

Larson, L.G., "Future Trends in Laser Imaging for the Graphic Arts Industry", SPIE, vol. 169, Laser Printing, pp. 22-28, 1979.

Li, et al., "High Power Diode Laser Marking and Engraving of Building Materials", SPIE, vol. 3097, pp. 600-611, 1997.

Miller, D.R., "Laser Etch Coatings for Automotive Applications", pp. 101-103, 1993 Abstract, SAE Technical Paper 930055.

Pires, et al., "Plywood inlays through Co2 Laser Cutting", SPIE, vol. 1042, CO2 Lasers and Applications, pp. 97-102, 1989.

Ramanathan, S., "Laser Cutting and Drilling of Ceramics and Ceramics Composites", vol. 54, No. 5 of Disserations Abstracts International, p. 2715-B, 1993.

Saunders, R.J., New Developments in Pulsed CO2 Laser Applications, SPIE, vol. 86, Industrial Applications of High Power Laser Technology, pp. 32-39, 1976.

Schell, K.J., "A security printers application of Lasers", SPIE Proceedings 396 (1983), pp. 131-140.

Scott, et al., "Laser Dulling of Metal Surfaces", ICALEO, pp. 23-31, 1991.

Sugimoto et al., "Fundamental Study on Laser Treatment of Architectural Materials", ICALEO, pp. 302-312, 1990.

van Krieken, et al., "Laser Micro Machining of material surfaces", SPIE, vol. 1022, Laser Assisted Processing, pp. 34-37, 1988.

(56) References Cited

OTHER PUBLICATIONS

Wade et al., Correcting Non-Linear Distortions in the Scanning and Printing Process, IBM Technical Disclosuer Bulletin, IBM Corp., vol. 26, No. 5, pp. 2516-2518, Oct. 1983.

Wallace, R.J., "Laser Hot Spot Machining", Mar. 1983, Abstract only, 1 pg.

Weiner, M.J., "Product Marking with ND:YAG and CO2 Lasers", SPIE, vol. 86, Industrial Applications of High Power Laser Technology, pp. 23-29, 1976.

Werner, J.R., "Laser Scanning and Facsimile at the New York Times", SPIE, vol. 169, Laser Printing, pp. 78-82, 1979.

Wittgrefe, et al., "Laser and Materials Technology for Flexible Decoration in Mass Production", SPIE, vol. 3097, pp. 340-343, 1997.

Tonshoff et al., "General machining concept for producing microoptics with high-power uv-lasers", SPIE, vol. 2992, pp. 150-158, 1997.

Kostrubiec, F., "Laser Modification of Macroscopic Properties of Metal Surface Layer", SPIE, vol. 2202, pp. 514-519, Sep. 26-30, 1993.

Weiloch, et al., "Use of Laser in the furniture industry", SPIE, vol. 2202, pp. 604-607, Sep. 26-30, 1993.

Swaczyna, et al., "Cutting inlays with a laser", SPIE, vol. 2202, pp. 608-613, Sep. 26-30, 1993.

IBM Technical Disclosure Bulletin, vol. 27, No. 10B, Mar. 1985, pp. 5970, "Laser Direct Imaging System for Print Band Manufacturing".

IBM Technical Disclosure Bulletin, vol. 27, No. 10B, Mar. 1985, pp. 6223-6224, "Preventing the formation of stripes in greytone image representations in dot printers with irregular paper advance".

IBM Technical Disclosure Bulletin, vol. 28, No. 5, Oct. 1985, pp. 2128, "Laser Printing of information plates".

Surplus GLOBAL, "Lumonics Light Writer SPe Laser Marker" brochure, pp. 1-5, Jan. 21, 2005.

EnRoute brochure/product summary Scanvec, 9 pages, date Dec. 20, 1996.

Vytek product brochure, Vinyl Technologies, Inc., 2006, 13, pgs.

Vytek web printout from http://www-vy-tek.com/Istar.html, 1 page, printed Feb. 5, 2009.

Prat, et al., "Pulsed-CO2 laser-material interaction: thermomechanical effects", Proc. SPIE 1810, 590 (1993) Abstract Only.

Znotins et al., "Materials Processing with Excimer Lasers", Proceedings of LAMP'87, Osaka (May 1987), pp. 581-584.

Kar, et al., "Two-dimensional model for laser-induced materials damage: Effects of assist gas and multiple reflections inside the cavity", J. Appl. Phys. 71, 2560 (1992) Abstract Only.

Technology Reinvestment Project Early Aware Selections Technology Development, "Precision Linear Machining", 5 pages from Oct. 1993, Whitehouse papers.

Carey, K.B., Laser dieboard cutting: The basic procedures, Boxboard Containers, Jun. 1979, pp. 52-53.

Ruffler, C., "Type LG 1062 High-Power CO2 Laser", Siemens Electronic Components Bulletin VIII (1973), No. 1, pp. 10-13.

Steen, W.M., "Laser Material Processing", Springer-Verlag, Chapter 3, pp. 79-107 "Laser Cutting", copyright 1991.

Zhang et al., "Laser Engraving", SPIE vol. 1804, Rapid Thermal and Laser Processing pp. 138-143, (1992).

Rauscher, G., "Laser Micromachining of Materials for Electrical and Electronic Devices", Applied Laser Tooling, 1987 Martinus Nijhoff Publishers, 15 pgs.

Rauch et al., "Effect of beam dwell time on surface changes during laser scribing", J. of Applied Physics, 57, 4209 (1985) Abstract Only.

Tatsumi, et al., "Recent trends of YAG/excimer laser machining", J of the Japan Society of Precision Engineering, vol. 52, No. 61, pp. 947-951, Jun. 1986 Abstract Only machine translated.

Chryssolouris, G., Laser Machining, Mechanical Engineering Series, Springer-Verlag, 1991, p. 209, 6, pgs.

Martyr, D.R., "High power laser processing of materials", Australian Welding Journal, 1986, pp. 19-22.

Scanvec, The Graphics Specialists, EnRoute User's Guide, revised Dec. 20, 1996, 23 pgs.

SYSTEMS AND METHODS FOR LASER MARKING WORK PIECES

CROSS-REFERENCE TO RELATED APPLICATION

This application claims the benefit of U.S. Provisional Patent Application Ser. No. 61/254,453, entitled SYSTEMS AND METHODS FOR CUSTOMIZATION OF LASER MARKED WORK PIECES and filed Oct. 23, 2009, the entire disclosure of which is incorporated herein by reference, to the extent that it is not conflicting with the present application.

BACKGROUND

Laser marking has been utilized to produce decorative or simulated patterns or images on work pieces of various materials, including, for example, metals, plastics, wood, and textiles. In some applications, as well known in the field of laser marking, the shade and/or depth of the laser marking may be varied by adjusting one or more of a number of parameters associated with a laser marking apparatus (e.g., a $CO_2$ or YAG laser), including, for example, the power or intensity of the laser source, the rate of movement of the laser beam over the material to be marked, the focus or "spot size" of the laser beam on the surface of the work piece, the duty cycle or pulse rate of the laser beam, and the number of passes of the laser beam over a specific location on the work piece. These types of conventional adjustments during the laser marking operation, used for decades in laser marking various materials, may be used to produce various images and patterns on a work piece.

To produce a laser marked pattern or image having portions of varying shades, an electronically stored image corresponding to the image to be marked may be generated, imported, or otherwise captured. The relative shade of each discrete location on the captured image may be associated with or calibrated to one or more stored power-related parameters of the laser marking apparatus (e.g., laser intensity, rate of movement of the laser beam, duty cycle, or number of passes), such that the laser marking apparatus may be programmed using the stored parameters to reproduce the captured image on the work piece. The laser parameters may be adjusted during operation of the laser marking apparatus in accordance with the stored parameters for each location to be marked.

SUMMARY

The present application describes systems and methods for laser marking a pattern on a work piece, such that a range of marking shades and/or depths of engraving are reproduced on the work piece. According to one aspect of the present application, a method of calibrating a laser marking system is provided for marking a pattern having a surface marked portion and a depth engraved portion. According to another aspect of the present application, a method of producing a pattern on a work piece is adapted to provide a pattern having a surface marked portion and a depth engraved portion. According to yet another aspect of the present application, a method of simulating a natural wood grain pattern on a work piece is provided, with the pattern having a surface marked portion and a depth engraved portion.

BRIEF DESCRIPTION OF THE DRAWINGS

Features and advantages of the invention will become apparent from the above detailed description made with reference to the accompanying drawings, wherein:

FIG. 12 is a photographic view of a full door laser marked and stained to simulate a wood grain pattern.

DETAILED DESCRIPTION

Figure 1:
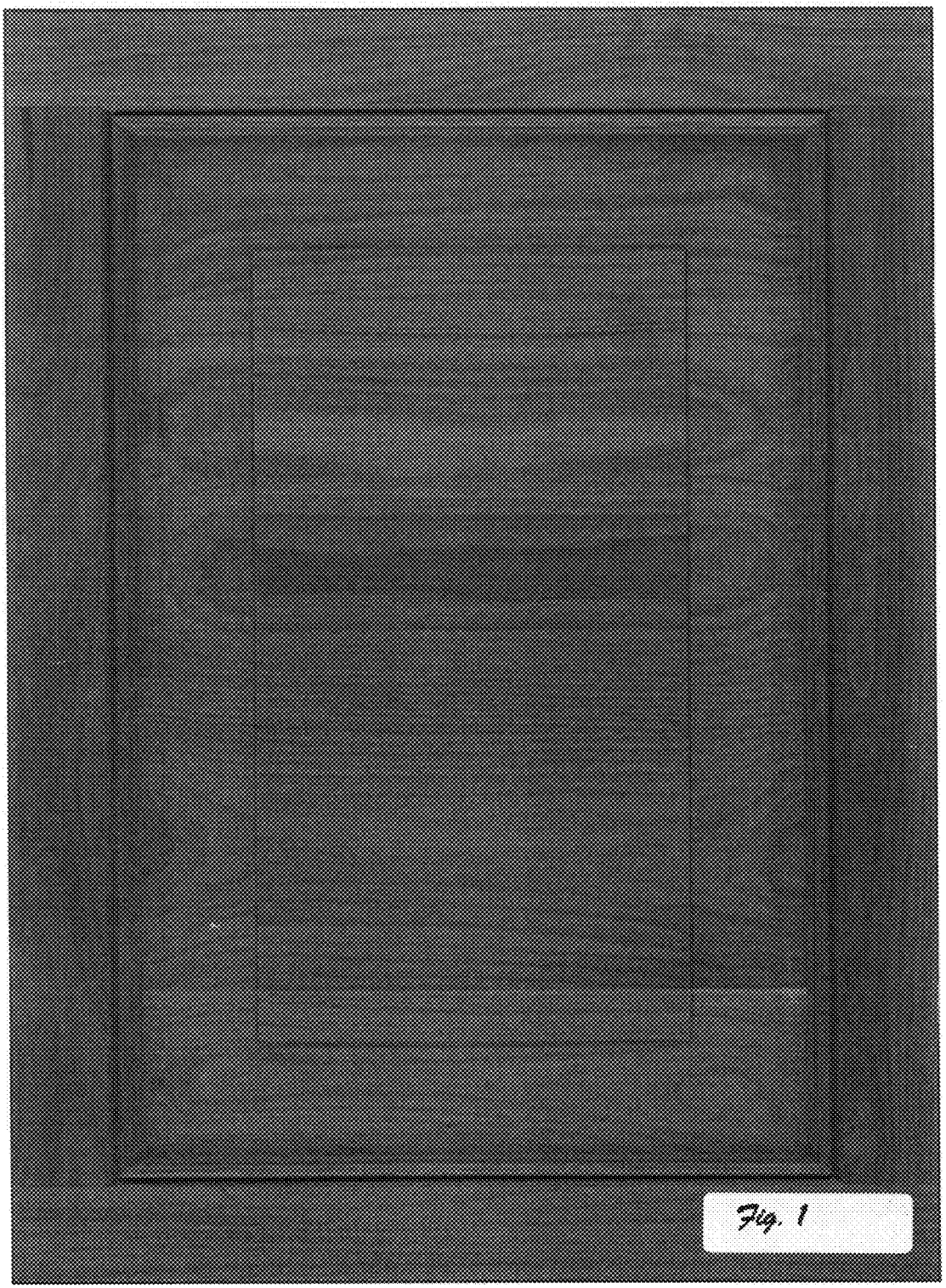
FIG. 1 illustrates a grayscale image of a wood grain pattern, as converted from a color photographic image.

This Detailed Description merely describes embodiments of the invention and is not intended to limit the scope of the claims in any way. Indeed, the invention as claimed is broader than and unlimited by the preferred embodiments, and the terms used in the claims have their full ordinary meaning.

Also, while the specific exemplary embodiments described in the specification and illustrated in the drawings relate to systems and methods for laser marking wood grain patterns on a fiberglass reinforced plastic (FRP) substrate (e.g., door or window frame), it should be understood that many of the inventive features described herein may be applied to marking other laser marked patterns on work pieces of other types and materials.

In an embodiment of the present application, an image of a pattern to be marked on a work piece is generated, copied, or otherwise captured. In one embodiment, the captured image may be a grayscale image, for example, an 8-bit grayscale image allowing for 256 incremental shades, with each incremental shade in the grayscale corresponding to an effective power setting or gradation (as achieved by adjustment of one or more of the above referenced parameters, as well known in the art). As used herein, "grayscale" may include any monochromatic scale, including, for example, bluescale, greenscale, and redscale. In other embodiments, color or black and white images may be utilized.

In one laser marking application, the incremental shades of a grayscale image to be laser marked may directly and proportionally correspond with a percentage of a maximum effective power output of the laser marking apparatus, as achieved by a combination of power-related parameters (e.g., laser intensity, rate of movement of the laser beam, duty cycle, number of passes). This maximum effective power output may correspond to a maximum power rating of the laser marking apparatus, or to some predetermined maximum power rating as determined by the user. For example, numbering the incremental grayscale shades of an 8-bit grayscale as 0 to 255, the "0" shade (white) may correspond to 0% of the maximum effective power output, the "255" shade (black) may correspond to 100% of the maximum power output, and the "127" shade may correspond to approximately 50% of the maximum power output.

Figure 7:
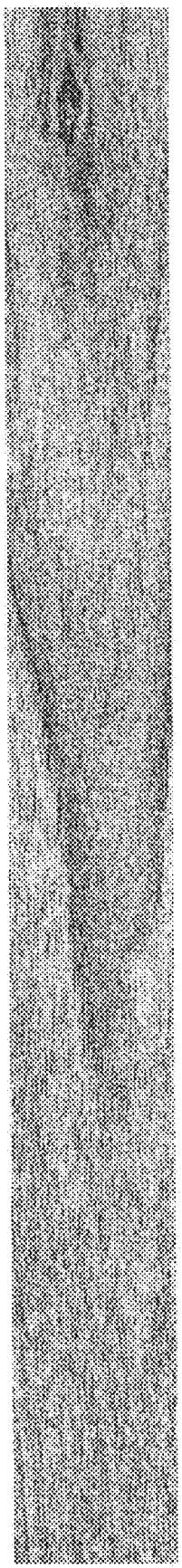
FIG. 7 is an image of a black and white dithered pattern simulating a grayscale wood grain pattern.
Figure 7A:
FIG. 7A is an enlarged view of a portion of the image of FIG. 7.
Figure 8:
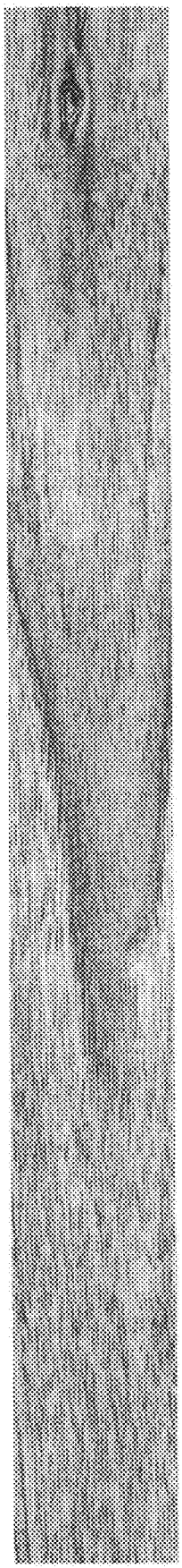
FIG. 8 is an image of a grayscale wood grain pattern.
Figure 8A:
FIG. 8A is an enlarged view of a portion of the image of FIG. 8.

In some applications, within some portions of the power output range, incremental changes in the power output may produce little or no noticeable effect on the laser marked work piece. As one example, across a low end portion of the power output range, treatment of the work piece by the laser may produce no visible marking on the work piece, such that the lighter grayscale shades are not reproduced on the laser marked work piece. As another example, across a higher portion of the power output range, laser markings on a work piece may be substantially the same shade despite being produced by power output settings corresponding to an extended range of grayscale shades. As a result, laser marking a grayscale pattern directly from a grayscale image may produce a marked work piece with little resemblance to the original grayscale image, as the darkest shades are undesirably blurred or blended together on the marked work piece, and the lightest shades are substantially imperceptible. In such an application, efforts to produce visible markings of the lighter grayscale shades by globally increasing the power settings of the laser marking apparatus often further blur the darker grayscale shades, while efforts to clarify or distinguish the darker shades by globally decreasing the power settings of the laser marking apparatus often bleach or even erase the lighter grayscale shades. For these reasons, past efforts to laser mark a digital grayscale image with true grayscale laser marking (i.e., by adjusting effective power settings during laser marking) have generally been foregone in favor of simulating a grayscale image using a variety of black-and-white, constant power, or limited incremental power methods, including for example, error diffusion, halftone, and diffusion dither. However, the resulting simulated grayscale images (see example in FIGS. 7 and 7A) may be less realistic in appearance than a true grayscale image (see example in FIGS. 8 and 8A), particularly when viewing the image close-up.

Accordingly, as described in greater detail below, incremental grayscale shades may be set to correspond with effective power output levels that are not directly proportional to the position of each grayscale shade within the entire range of shades. For example, a lightest visible grayscale shade may be set to correspond with an increased effective power output level that is sufficient to produce a visible marking on the work piece. As another example, a darkest visible grayscale shade may be set to correspond with an effective power output level that is below the maximum power output level, for example, where a further increase in the power output produces negligible darkening of the laser marking or excessive depth of engraving. Further, under some circumstances, changes to the effective power output may produce changes in the shade of laser marking that are nonlinear, with greater incremental changes in laser marked shade over some portions of the effective power output range than over other portions of the range. In such an application, calibration of the grayscale shades with corresponding power output levels may be conducted at predetermined increments within the grayscale range, for more accurate reproduction of the laser marked grayscale image. Additionally or alternatively, the digital grayscale image may be altered such that locations or pixels on the digital image may be selectively darkened or lightened to produce the desired level of laser marking on the work piece.

Laser marking systems and processes in accordance with the present application may be utilized for marking many different types of images and patterns. In one embodiment, an exterior surface of a material may be laser marked to simulate a different material. For example, a plastic material, such as fiberglass reinforced plastic ("FRP"), may be laser marked with a wood grain pattern, to give the plastic work piece the appearance of wood. In an exemplary embodiment, an FRP work piece (e.g., a door, window frame, desk panel, table top, or other such component) may be laser marked with a wood grain pattern to simulate a wood component. While the laser marked surface may be limited to surface patterns (i.e., markings without a noticeable depth of engraving), in one embodiment, portions of the wood grain pattern, such as, for example, knots, distress marks, or deep grain lines, may be laser marked using higher power output, longer dwell time, slower laser movement or scan speed, multiple passes, or other such parameters, such that a noticeable or tactile depth of engraving is provided on the work piece for these wood grain features. As a result, an FRP work piece may be provided with both the look and feel of an authentic wood panel. Further, by applying a selected stain or other shade enhancing material to the laser marked work piece in combination with a wood grain pattern consistent with a certain wood type, the work piece may be adapted to realistically simulate many different types of wood, including, for example, oak, maple, cherry, and walnut.

While grayscale wood grain patterns may be generated using many different techniques, in one embodiment, one or more wood grain patterns may be digitally photographed to produce grayscale images of the wood grain pattern, either by directly capturing a grayscale photograph, or by capturing a color photograph and converting the photograph to grayscale. One example of a grayscale image of a wood grain pattern is shown in FIG. 1. The resulting digital grayscale images may then be converted to a computer readable code. Using this computer readable code, the laser marking apparatus may be operated to reproduce the grayscale image on the work piece using the laser parameters corresponding with the grayscale shades of each location or pixel in the digital grayscale image.

Depending on the material of the work piece to be marked, the number of increments in the grayscale/power output spectrum, and the maximum power output setting of the laser marking apparatus, effective power output settings associated with the lightest grayscale shades may be insufficient to produce any visible alteration of the work piece. Additionally, effective power output settings associated with a significant range of grayscale shades may produce little or no variation in the visible markings produced, causing these portions of the pattern to blur or blend together. Further still, darkest grayscale shades may result in noticeable depth of marking (or engraving) of the work piece, in addition to visible alteration of the marked portions.

Laser marking a work piece using power outputs that directly and proportionally correspond with incremental shades of a grayscale image may result in a laser marked image that does not accurately depict the grayscale image, as lighter portions of the grayscale image may not appear at all in the laser marked image, while darker portions of the grayscale image may be blurred or blended together, or reproduced as depth engraved portions that are not significantly darker in shade than the darkest of the non-depth engraved markings. Where depth of engraving in a laser marked pattern is only desired for discrete portions of the pattern, a grayscale image captured from a digital photograph may not be able to discriminate between portions requiring darker surface markings and portions requiring depth engraving. This is due in part to the fact that a captured photographic image of a pattern may not be able to accurately depict which portions of the pattern should be reproduced with depth engraving, which portions should be reproduced with only surface marking, and the nonlinear effects on marking shade or depth as a function of increased laser power.

To provide visible laser markings corresponding with the lightest shades in the grayscale image, the laser marking parameters corresponding to the grayscale shades may be universally increased or shifted such that the laser parameters corresponding to the lightest grayscale shades in the image produce visible laser markings. Alternatively, the digital image itself may be universally darkened, such that all grayscale shades in the digital image correspond to laser parameters sufficient to produce visible laser markings. However, these universal adjustments or shifts in the laser marking parameters may produce the aforementioned blurring or blending of the darker portions of the pattern, or even produce noticeable or even excessive depth of engraving in portions of the pattern for which only visual surface markings are desired. This is due in part to the fact that a captured photographic image of a pattern may not be able to accurately depict which portions of the pattern should be reproduced with depth engraving, which portions should be reproduced with only surface marking, and the nonlinear effects on marking shade or depth as a function of increased laser power.

According to an aspect of the present application, a full grayscale spectrum that corresponds with a percentage of a maximum power output of a laser marking apparatus may be divided into three laser marking zones: (1) a first zone in which the power output of the laser has no visible effect on the work piece surface; (2) a second zone in which the power output of the laser produces visually perceptible markings on the work piece surface (without noticeable depth of engraving); and (3) a third zone in which the power output of the laser produces markings of noticeable depth. According to another aspect of the present application, a laser marking system may utilize a digital image including unmarked portions having no visible effect on the work piece and marked portions adapted to produce a pattern including portions to be reproduced as visible surface markings and portions to be reproduced as engravings of noticeable depth. One or more photographs or other images of a pattern having visible surface portions and/or depth portions is initially captured, for example, by a digital camera, to produce a digital grayscale image of the pattern to be marked. The pattern, as shown in FIG. 1, includes first portions intended to be reproduced as visible surface markings only, without noticeable depth (e.g., light grain lines or rings in a wood grain pattern), and second portions intended to be reproduced as engravings of noticeable depth (e.g., knots or pronounced grain lines in a wood grain pattern). However, without adjusting the image, portions of the pattern to be surface marked may include pixels that are too light (i.e., corresponding to the first zone of laser marking) or too dark (i.e., corresponding to the third zone of laser marking). Likewise, portions of the pattern to be depth engraved may include pixels that are too light (i.e., corresponding to the first and second zones of laser marking).

By identifying the zones of laser marking (as described in greater detail above) for a particular material, realistic visual contrast may be achieved for the visible surface markings of the first portions of the pattern, and a realistic "feel" may be achieved for the depth engravings of the second portions of the pattern. The grayscale shades of the first portions of the pattern may be adjusted (proportionally or otherwise) to correspond to the second zone of laser marking, such that all of the first portions of the pattern for which surface marking is desired are visibly marked without depth. Similarly, the grayscale shades of the second portions of the pattern may be adjusted (proportionally or otherwise) to correspond to the third zone of laser marking, such that all of the second portions of the pattern for which depth engraving is desired are engraved with depth. By adjusting portions of the pattern such that they are primarily in one of the first zone (for non-visible laser treatment), the second zone (for visual markings) or the third zone (for depth engravings) without similarly or simultaneously adjusting other portions of the pattern that are primarily in the other two zones, a desired laser treatment or marking effect may be achieved for the selected portion of the pattern to be adjusted, without undesirably affecting the laser markings of the other portions of the pattern.

The adjustment of grayscale shades in a portion of an image may be uniform or universal. In other embodiments, to improve the contrast, clarity or appearance of the surface marked portions of a pattern, some pixels within the portion may be lightened, either to a lighter shade corresponding with a lower power setting within the second zone, or to a white (or "zero") shade or some non-zero grayscale shade that corresponds with a power setting in the first zone of laser marking. Other pixels may be darkened to varying degrees to correspond with higher power settings within the second zone of laser marking or to a higher power setting that places the pixels within a third power zone setting corresponding to depth engraving. While these pixels may be selectively adjusted by the operator of a digital image editing program, the portion of the pattern may likewise be adjusted in accordance with a predetermined adjustment function calculated to produce the desired resulting laser marked pattern, either before or after a stain or other such treatment is applied. For example, a pattern adjusting function may be configured to darken pixels within a predetermined higher sub-range of grayscale shades by a predetermined factor, and to lighten (e.g., by a predetermined factor) or omit pixels within a predetermined lower sub-range of grayscale shades.

In one embodiment, to properly mark the first portions of the pattern while properly engraving the second portions of the pattern, the first portions of the pattern may be isolated, separated, or otherwise distinguished from the second portions of the pattern. For example, the first and second portions may be isolated into separate images or separate areas of the same image. As another example, the first and second portions of the pattern may be provided in multiple separate layers of a combined image (similar to the layers used in AUTOCAD®, PHOTOSHOP®, or other graphics editing software), such that a first layer including the first portions of the pattern may be isolated and adjusted while maintaining the grayscale shades (and corresponding laser parameters) of a second layer of the image including the second portions of the pattern (and vice versa). In one such arrangement, features of the image may be isolated into layers and each layer may include surface marked, depth engraved, and non-marked portions of the pattern. In an exemplary embodiment, each layer includes a portion or feature of the pattern that is predominantly either a surface marked portion of the pattern or a depth engraved portion of the pattern. As initially captured in a photographic image, however, the portion or layer of the image may include pixels having grayscale shades that undesirably correspond to the other two laser marking zones. Adjustment of a layer allows pixels associated with a surface marked portion to correspond with the second zone of laser marking, and pixels associated with a depth engraved portion to correspond with the third zone of laser marking. It should be noted that an adjusted layer may include pixels corresponding with all three zones of laser marking.

The multiple layers that form a pattern to be laser marked may be separated or extracted from a captured digital image, such that each feature of the digital image is represented by one layer. In other embodiments, a supplemental surface marking or depth engraving feature may be added to an existing digital image by overlaying the layer including the supplemental feature onto an existing layer or portion of the original digital image. In such an embodiment, the darker pixel of the overlaying supplemental feature may override the coinciding lighter pixel of the original digital image, for example, when the image is converted to a raster file, as described in greater detail below.

In one embodiment, multiple layers of a pattern may be created at least in part from a color photographic image by separating the color image into two or more color channels, and creating a layer from the channel that most clearly displays the feature or features to be included in the layer. For example, a color photographic image may be separated into red, blue, and green channels (for example, using photo editing software, as described herein). The three channel views of the image are examined to identify the channel view that best illustrates a feature for which inclusion in a layer is desired (for example, wood grain lines, a knot, or distress markings). Using editing software, a mask may be created to eliminate all other pixels from the view, so that only pixels corresponding to the desired feature remain, thereby creating a layer of the desired feature. Upon creating the layer, the grayscale (i.e., any monochromatic scale) shade of the pixels remaining in the layer may be adjusted to achieve a desired visual or tactile effect, as described herein. By isolating and adjusting individual features, each feature can be enhanced for improved clarity, shade, depth, and/or contrast, without degrading other features for which different adjustments may be required.

Figure 9:
FIG. 9 is a photographic grayscale image of a knot feature for a wood grain pattern.
Figure 10:
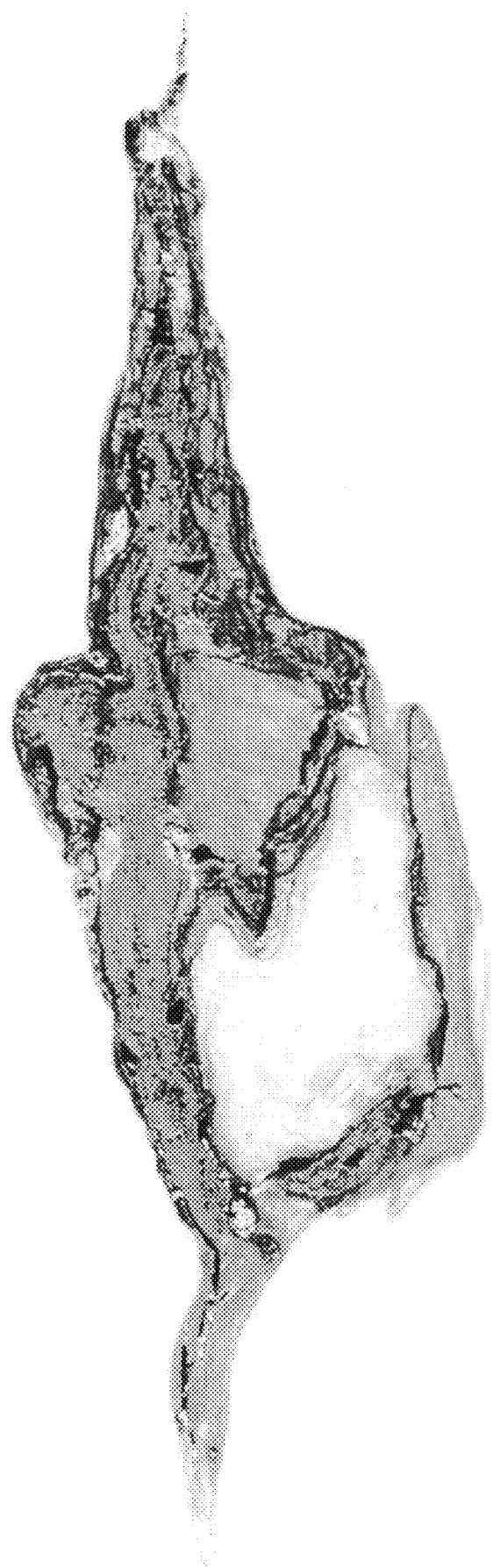
FIG. 10 is a photographic grayscale image of another knot feature for a wood grain pattern.

In the exemplary embodiment described herein, knot features, deep grain lines, distress marks, or other features in a wood pattern to be laser marked with noticeable depth may be separated or extracted from the remaining wood grain features of an image, as one or more layers of the image, or may be provided as a separate image, as shown in FIGS. 9 and 10. In an exemplary embodiment, multiple first and second portions or layers of the image may correspond to multiple features of the pattern. Upon obtaining the separate portions or layers, the grayscale of one or more of the first portions (or the corresponding laser parameters) of the pattern may be individually or collectively adjusted or shifted (either from an original grayscale image or from a color photographic image) while maintaining or keeping constant the grayscale shades of the second portions of the pattern. As a result, pixels within the first portions of the pattern that correspond with the surface marked portions of the pattern may be set to correspond to (or fall within) the second zone of laser marking. In one example, the grayscale shades of the first portion corresponding to the surface marked portion of the pattern may be adjusted so that the lightest visible shade corresponds to the low end of the second zone of laser marking, and the darkest visible shade corresponds to the high end of the second zone of laser marking. Pixels within the first portions that do not correspond to the surface marked portion of the pattern may be omitted (made "white") or set to correspond to (or fall within) the first zone of laser marking. This extraction of lighter or unwanted portions of the image may help to produce clear, distinct visible markings for all of the surface marked portions of the pattern. It should be noted that some pixels within the adjusted first portion of the pattern that do not correspond to the surface marked portion of the pattern may correspond to the third (depth engraved) zone of laser marking.

Figure 2:
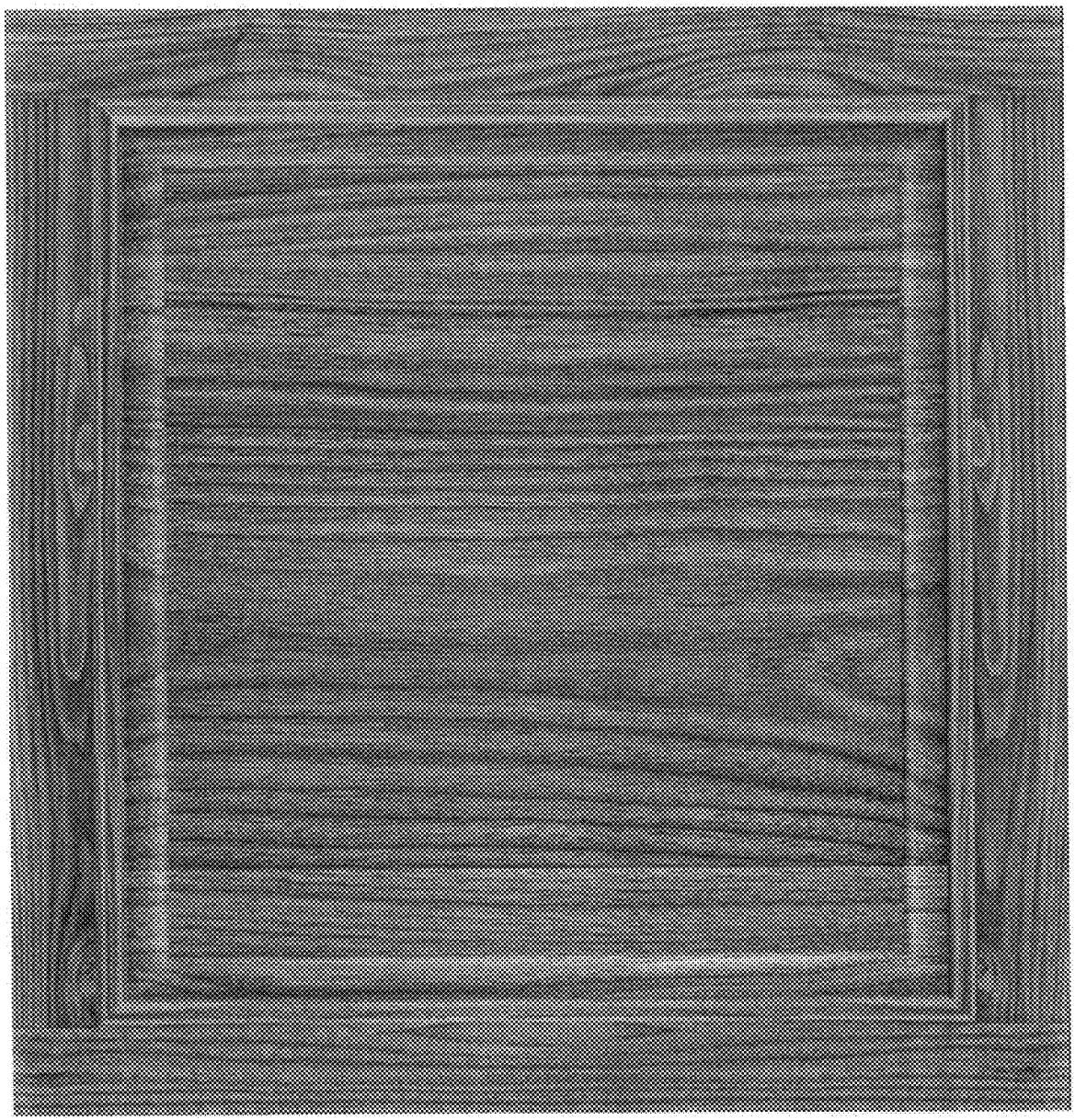
FIG. 2 illustrates a grayscale image of a wood grain pattern adjusted to enhance the contrast of a laser marked pattern produced from the grayscale image.
Figure 3:
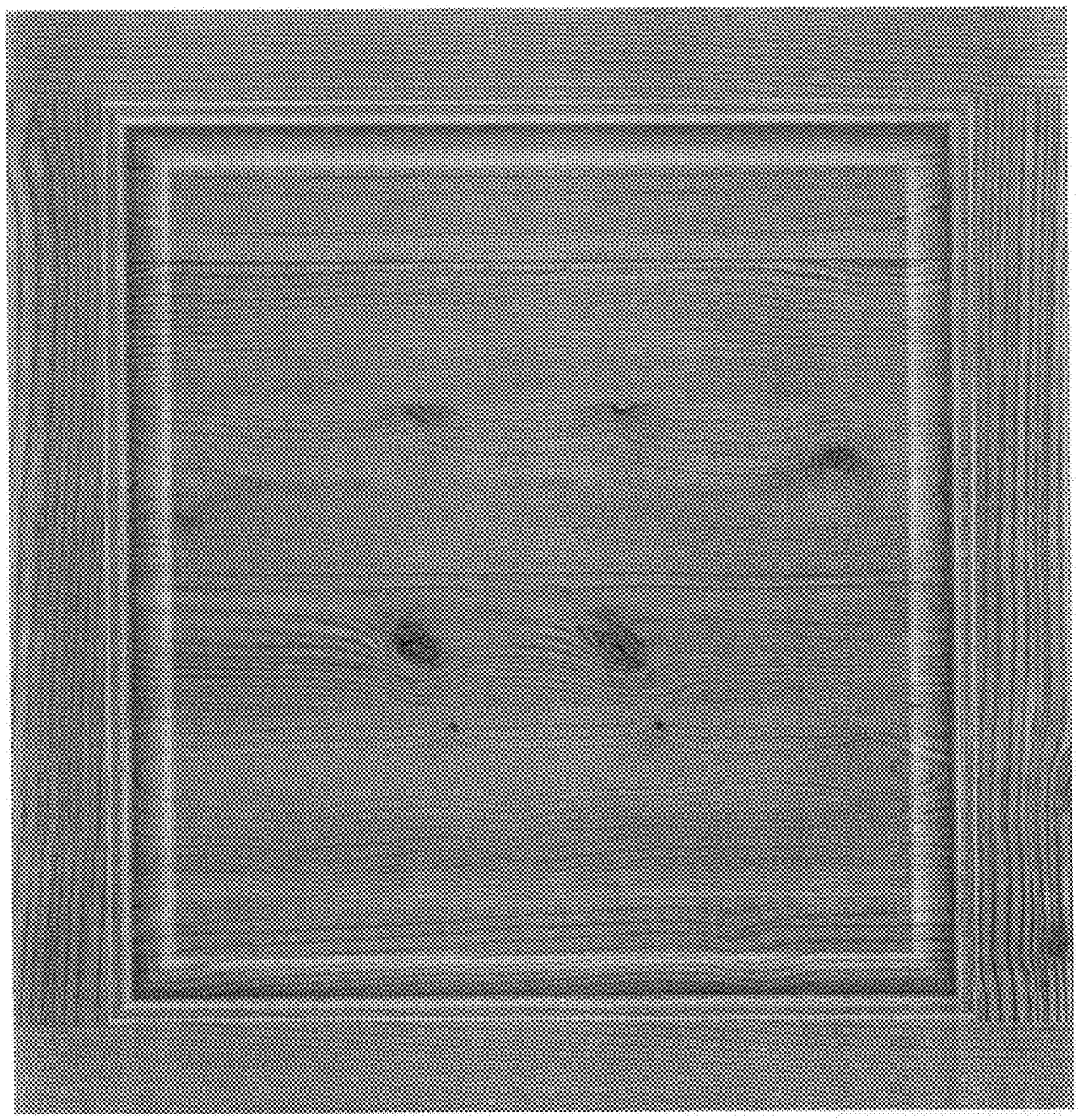
FIG. 3 illustrates a grayscale image of a wood grain pattern adjusted to enhance the contrast of a laser marked pattern produced from the grayscale image and to provide for depth engraving of identified features.

FIG. 2 illustrates a grayscale image of a wood grain pattern in which the grayscale shades of portions to be marked as visible surface markings have been adjusted to a range corresponding with the second zone of laser marking. Similarly, the grayscale of the second portions (or the corresponding laser parameters) of the pattern may be adjusted or shifted while maintaining or keeping constant the grayscale shades of the first portions of the pattern. As a result, each grayscale shade of the second portions of the pattern may be set to correspond to (or fall within) the third zone of laser marking, to produce depth engraved markings for all of the second portions of the pattern. FIG. 3 illustrates a grayscale image of a wood grain pattern in which the grayscale shades of portions to be marked as depth engraved features (e.g., knots in the wood grain pattern) have been adjusted to a range corresponding with the third zone of laser marking. By defining and isolating the first and second portions of the pattern, adjustment of the corresponding pattern features may produce a more realistic look and feel of the laser marked work piece.

In some applications, the appearance of a laser marked pattern on a work piece may be altered or enhanced by treating the marked surface with a shade enhancing coating, such as, for example, a stain. Certain laser marked or engraved materials, such as, for example, fiberglass reinforced plastic ("FRP"), may experience increased stain adhesion on the laser treated portions of the material, as microscopic cuts or abrasions in marked portions of the material increase the surface area in contact with the applied stain. Staining of a laser marked work piece may require less stain and allow for faster drying times than, for example, a work piece with molded or embossed depth features, as light coatings of stain tend to appear on the laser ablated surfaces more readily. In contrast, the smoother embossed or molded recesses of an embossed or molded work piece require pooling of larger amounts of stain, resulting in longer required drying times. Further, when staining an embossed or molded work piece, lighter markings and surface features (i.e., features that may not be reproduced by molding or embossing) are conventionally produced by more intricate, complex, and time consuming staining procedures. These same lighter markings may be more easily and efficiently produced by low power laser marking. As another benefit, where limitations in the contrast between darker grayscale shades are experienced, for example, due to limitations of the material being marked, the laser marking apparatus may be adjusted to produce lighter, more clearly distinguishable markings which may be darkened by staining (e.g., with a darker stain) to produce darker patterns of improved contrast.

A stain used with the laser marked work piece may be selected to provide desirable appearance and durability properties. For example, a stain may be selected for use with a FRP substrate to provide adherence at a 4B level per ASTM D3359, a finish with a maximum wear index of approximately 120 per ASTM D4060, a minimum scratch and gouge resistance of F pencil hardness per ASTM D3363 and fade resistance corresponding to a maximum $\Delta E$ of about 5 at 2000 hours exposure to QUV-A per ASTM G154 and ASTM D6695. While many different coatings or treatments may be utilized, in one embodiment, a rapid drying stain may be applied, an example of which is described in co-pending U.S. patent application Ser. No. 12/505,702, entitled Rapid Dry Fiberglass Stain and filed on Jul. 20, 2009, the entire disclosure of which is incorporated by reference herein. This may further improve drying time of the stained, laser marked work piece, for more efficient production. As another example, a water-based tinted coating may be sprayed or hand-applied to a work piece with a water-based polyurethane top coat. Examples of water-based coatings include wiping stains and polyurethane top coats available from Akzo Nobel.

Accordingly, in one embodiment, areas of a work piece exposed to a laser are coated with a thin layer of stain to produce increased contrast between modified (marked) and unmodified (unmarked) areas. Color or shade readings may then be taken after staining (in addition to, or instead of, before staining) using a color measurement instrument such as a densitometer, colorimeter, or spectrophotometer to quantify the light reflected by each area of the specimen that corresponds to a set percentage of the laser's rated power output. Adhesion values may also be determined for each area using a standard test method such as ASTM D3359.

Figure 4:
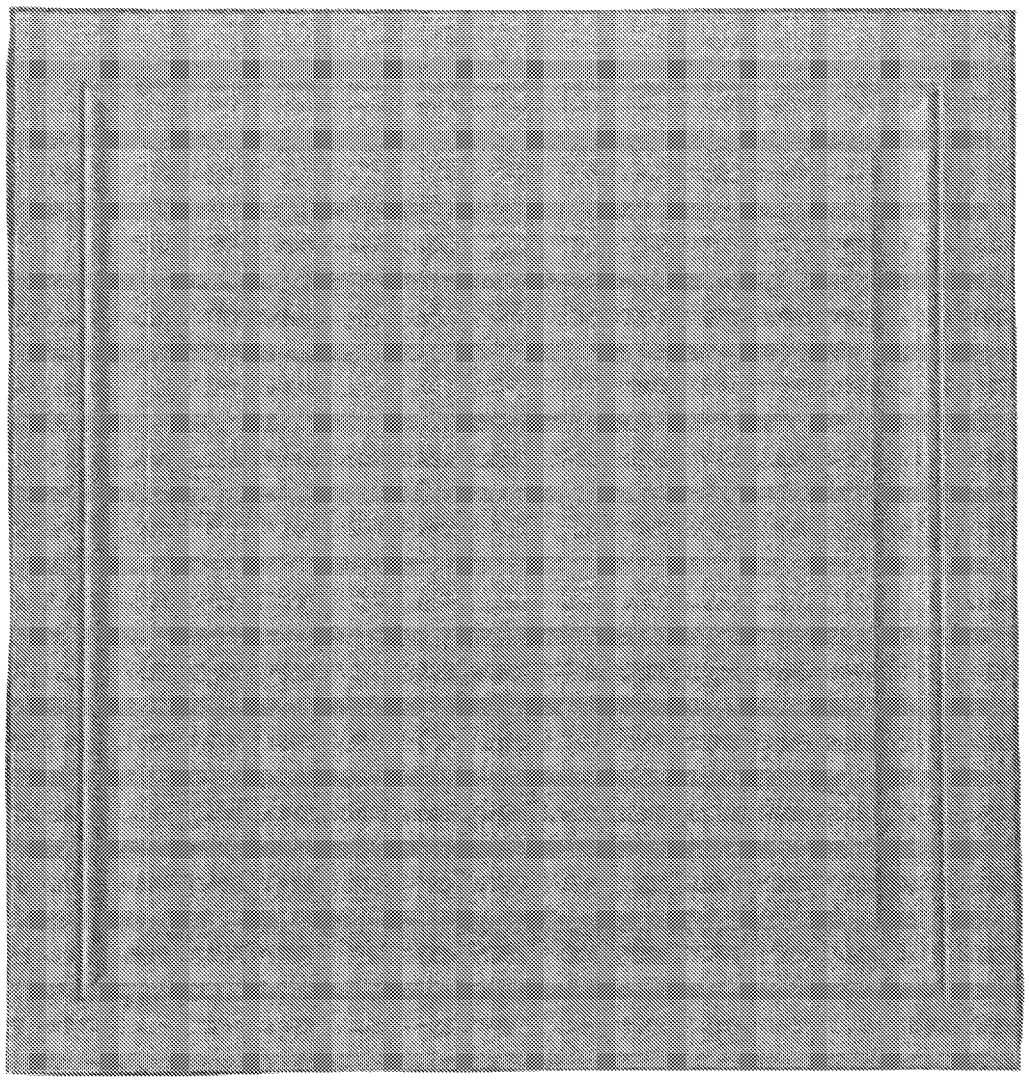
FIG. 4 is a photographic view of a door panel laser marked with a wood grain pattern.
Figure 5:
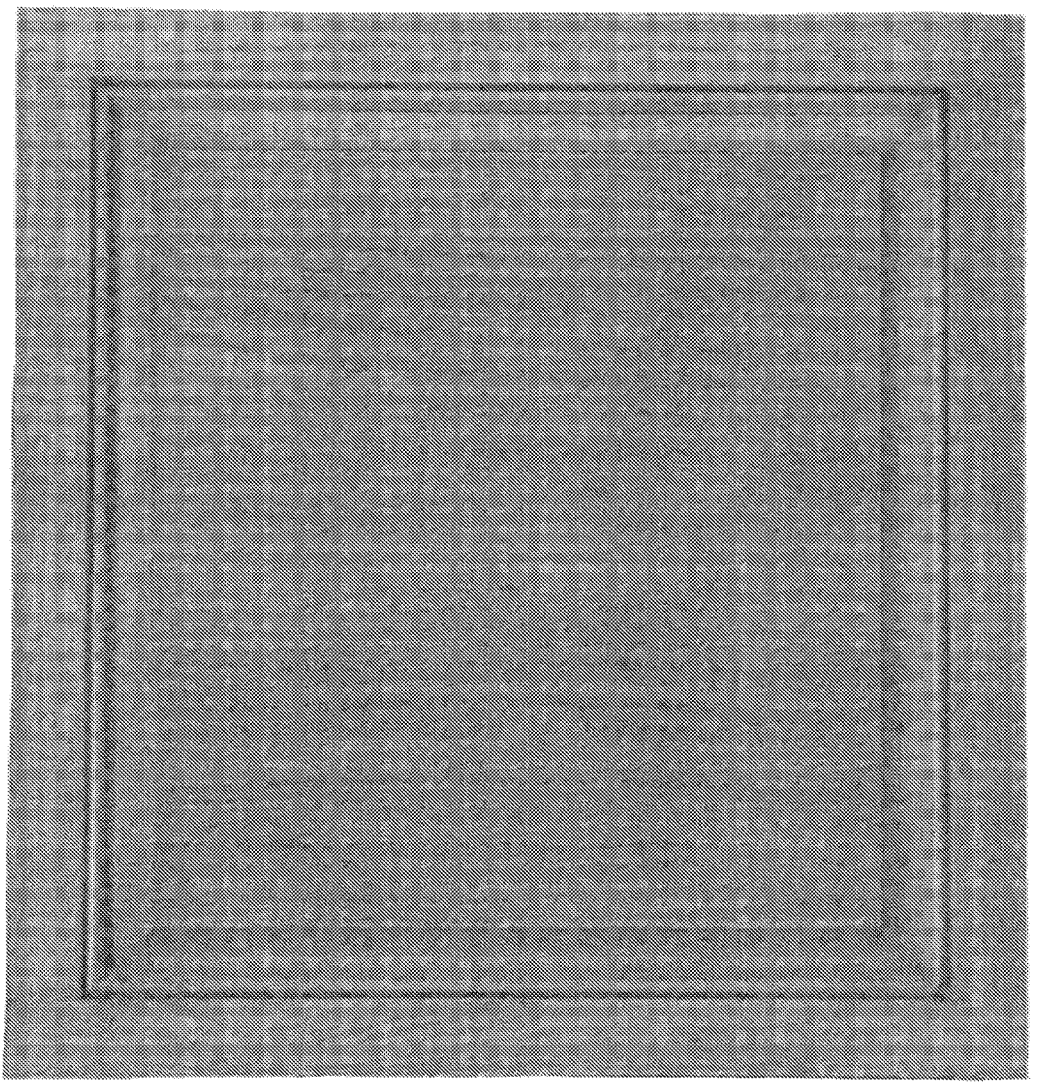
FIG. 5 is a photographic view of a door panel laser marked with a wood grain pattern and stained.

FIG. 4 is a photographic view of an FRP door panel laser marked with a walnut wood grain pattern in accordance with aspects of the present application, prior to staining the panel. FIG. 5 is a photographic view of an FRP door panel that has been laser marked with a walnut wood grain pattern and then stained, darkening the base or unmarked portions of the panel, as well as enhancing the contrast of the marked wood grain portions.

While "blank" portions of the image may be avoided by the laser altogether (i.e. by not passing the laser over these portions or by turning the laser off), these blank portions may instead be treated using laser parameters within the first zone of laser treatment, such that no visible markings are produced on the work piece. In some applications, while such low-power laser treatment does not produce visible markings on the surface of the work piece, the laser may still produce imperceptible abrasions or ablations on the surface of the work piece, which it is believed may enhance adhesion of a stain or other coating to the surface of the work piece.

To properly assign laser marking parameters to a range of incremental grayscale shades for marking both visible "surface" features and engraved "depth" features, incremental laser marking tests on a work piece of the material to be utilized may be conducted. In an exemplary method of calibrating a laser marking system to produce a desired laser marked image or pattern corresponding to a grayscale image, a digital image of a grayscale grid is created with an array of locations or areas each representing a single shade of gray in graduated increments ranging from 0% black (100% white) to 100% black. The areas in the digital image may be of sufficient size to obtain color, depth, adhesion, and any other measurements relevant to a particular application. The grid may be uploaded or imported into laser control software associated with the laser marking apparatus. The software may be configured to translate each shade of gray to a percentage of the laser's maximum power setting, such that a lightest grayscale shade corresponds with a minimum power parameter and a darkest shade corresponds with a maximum power parameter. In another embodiment, the laser marking apparatus may be programmed to produce a grayscale grid using incremental power parameters over a region of the work piece without providing a grayscale grid image to be duplicated. In varying the power parameter, one or more of many laser settings may be adjusted, including, for example, laser wavelength, power, travel speed, dwell time, number of passes, pulse frequency, acceleration, resolution, lens focal length, and deviation from focal plane (for engraving non flat surfaces), as are well known in the art. The resulting program may be run on a test piece provided in a material of interest.

Figure 6:
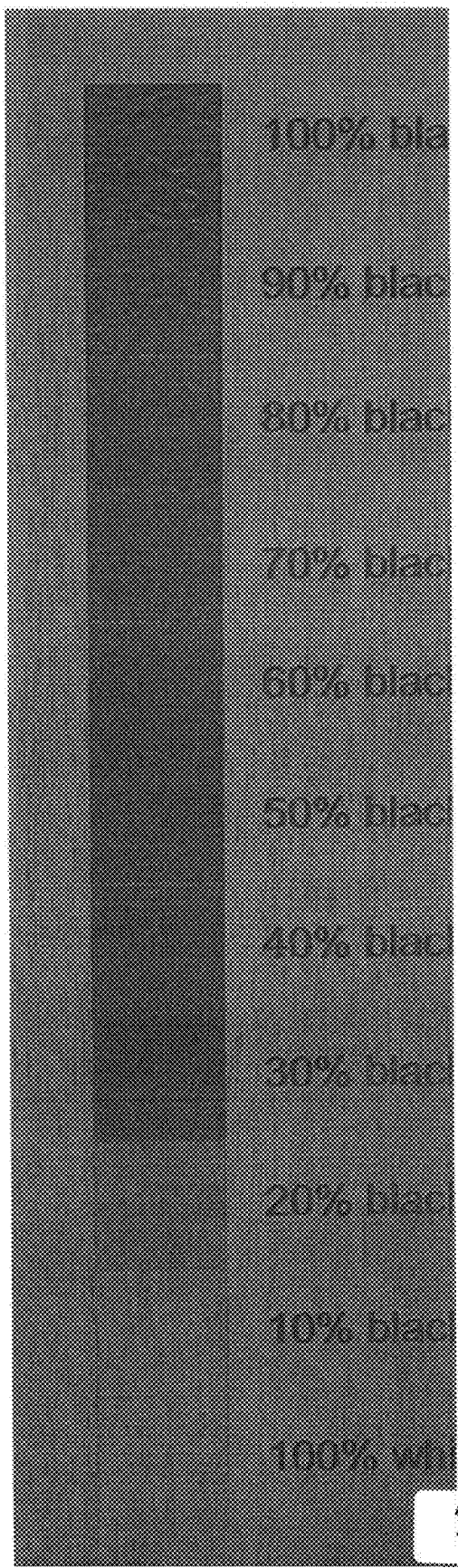
FIG. 6 is a photographic view of a grayscale test grid.

After operating the laser marking apparatus in accordance with the program and removing resulting debris from the surface of the work piece (if necessary), the marked areas on the resulting grid may be tested for shade (before or after application of a stain or other coating, if so applied), either qualitatively (e.g., by visual inspection) or quantitatively (e.g., using a densitometer, colorimeter, or spectrophotometer), and/or for depth of engraving (e.g., using a depth gage or feeler gage). Other properties of the marked work piece may additionally or alternatively be tested, including, for example, stain adhesion. FIG. 6 illustrates one such laser marked test grid with a stain applied to the marked surfaces, which may produce a more pronounced effect on the laser marked portions of the test piece.

The resulting laser marked grid on the test piece, combined with identified and recorded laser parameters, may be used to identify the three laser marking zones specific to the identified laser parameters and work piece material. The parameters at which no effect on the work piece material is observed (prior to staining) are assigned to a first laser marking zone. The range of parameters at which primarily visual appearance of the marked work piece surface is affected is assigned to a second laser marking zone. The parameters at which noticeable (e.g., noticeable by the operator) depth engraving is produced are assigned to a third laser marking zone. Further, the first laser marking zone may be divided into two sub-zones; a first sub-zone, in which stain adhesion is no different from stain adhesion of an untreated portion of the test piece, and a second sub-zone, in which stain adhesion is noticeably enhanced. By identifying these zones, more realistic laser marked images and patterns may be reproduced by adjusting the grayscale shades of an image to be reproduced to correspond with the aforementioned zones of visible marking and depth engraving, at power levels selected to provide proportionally accurate shade and depth of marking and engraving.

The grid-producing calibration process may be repeated with smaller graduated increments and grayscale ranges to better discriminate the portions of interest within the three zones. This enables generation of a refined set of laser power output parameters to define a full range of visual appearance and depth of engraving while eliminating wasted data and energy for any given set of laser and material parameters.

Once this data is obtained, any one or more of the laser, material, or material treatment parameters may be modified and this process repeated to understand the response, effect, and sensitivity of these parameters. In this manner, a complete data set may be compiled and calibrated to define inputs for image manipulation to achieve the desired feel and appearance on a given material. While any of the aforementioned laser marking parameters may be modified during testing or during production of the laser marked work pieces, it is generally desirable to maintain a high (or even maximum possible) scan speed to maximize production efficiency. As such, low scan speed testing or production, or testing or production using scan speeds or dwell times that may result in excessive ablation or damage to the work piece, is not employed or considered when developing laser marking systems or methods in accordance with the present application.

By using grayscale photographic images to produce laser marked patterns on work pieces, customization and variation of laser marked patterns may be easily accomplished (for example, as compared to a molded or embossed work piece requiring a different or modified mold or die for each variation in the molding or embossment). According to another aspect of the present application, a full pattern for laser marking may be divided into an array of portions or panels, with each panel being replaceable or modifiable independent of the other panels. By utilizing a limited number of grayscale image panels, a great number of panel combinations may be utilized to produce distinct overall patterns.

Figure 11:
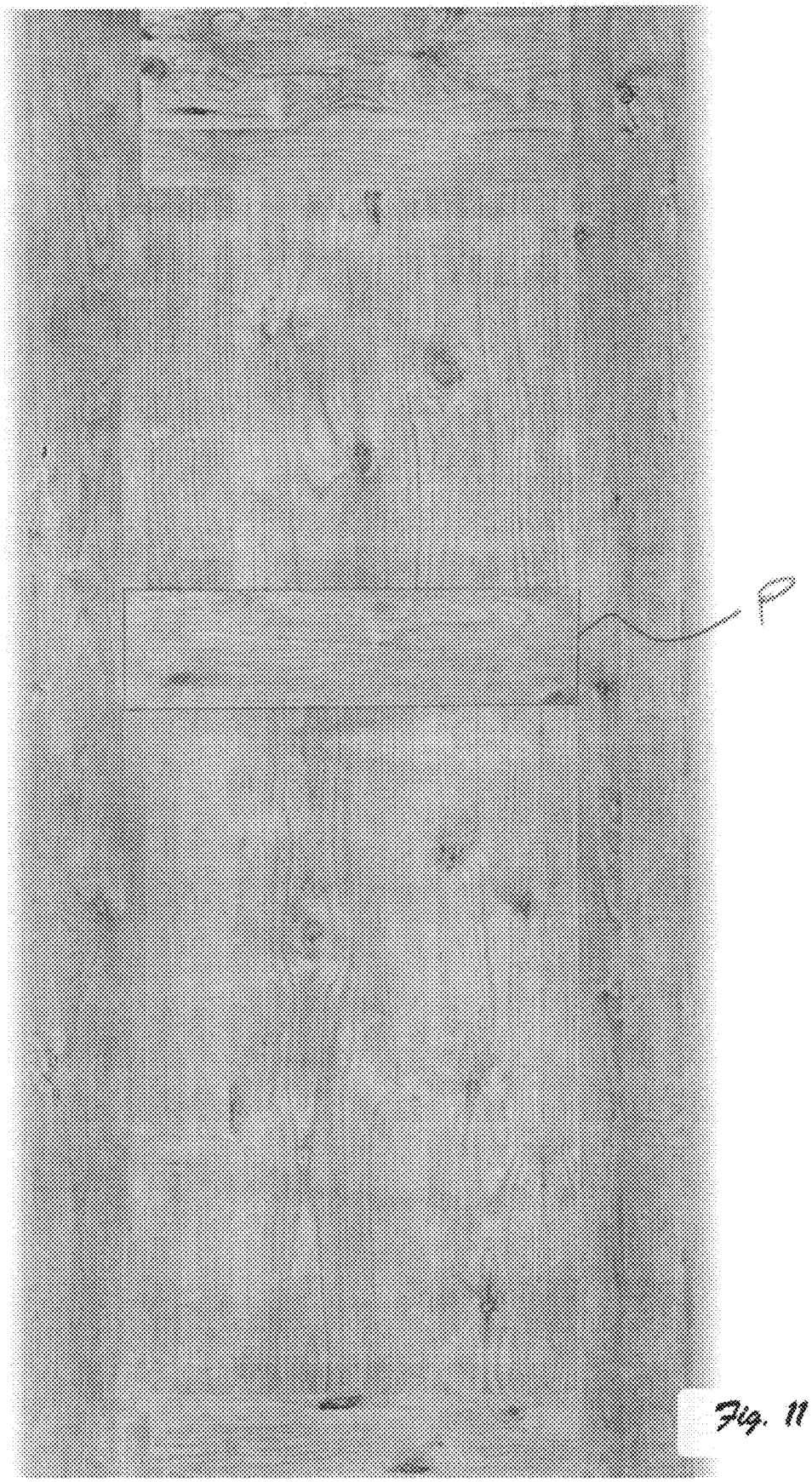
FIG. 11 is a grayscale image of a wood grain pattern for a full door.
Figure 18:
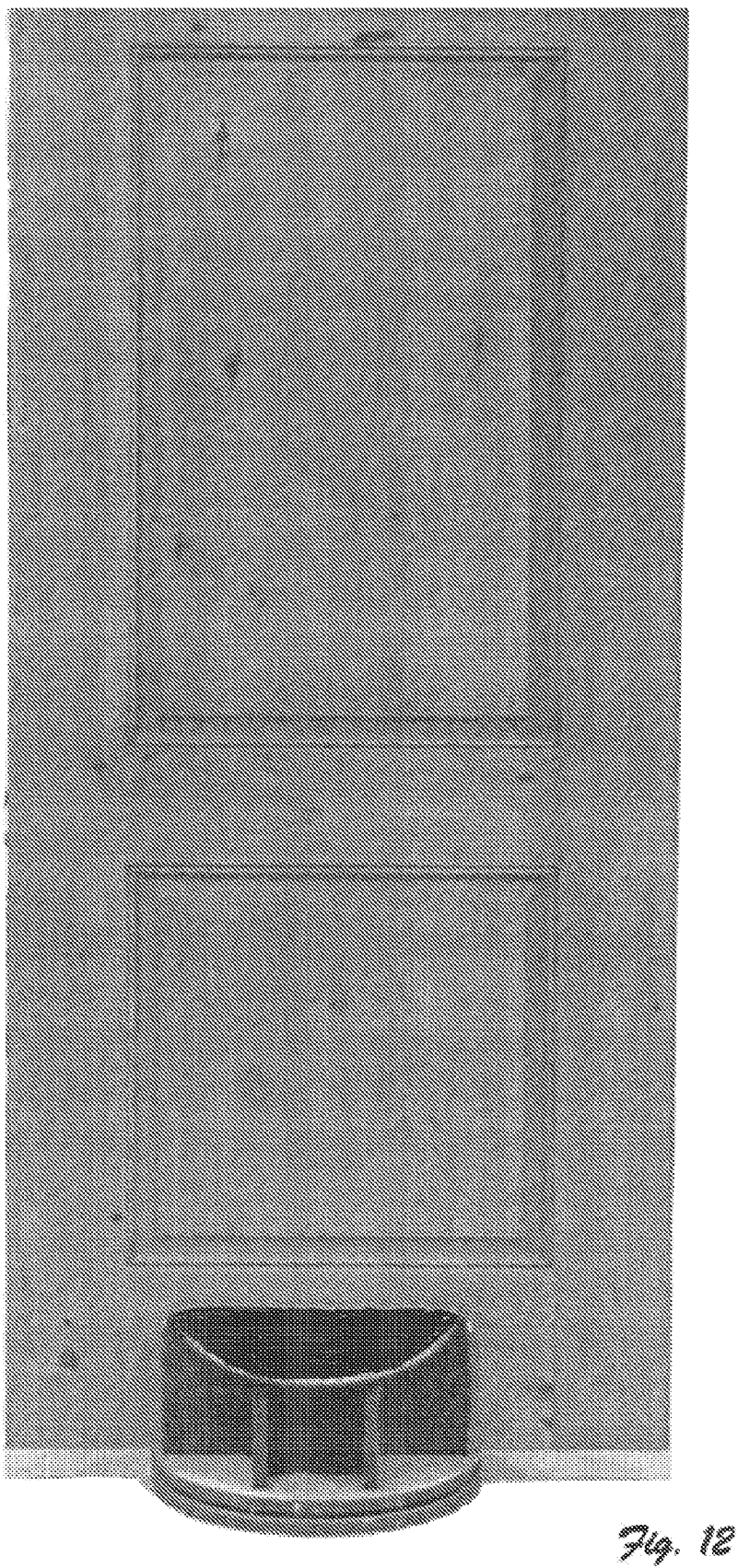

In one example, multiple image panels representing individual wood components (e.g., planks, panels, and contoured woodworking) may be used to create many distinct laser marked doors of varying appearance. More distinguishable features of the patterns (such as, for example, knots in a wood grain pattern) may be positioned at different locations on each door, so that noticeable variations in a series of doors will result in more realistic and natural looking wood grain patterns. By compiling a limited number of image panels in a library of door subassemblies, hundreds or thousands of distinct door patterns may be generated efficiently, without having to store and index thousands of complete door patterns. Additionally, image panels displaying wood grain patterns of different wood types may be used together to simulate multiple wood type inlays. FIG. 11 illustrates a grayscale image of a wood grain pattern for a full door, with one of the multiple wood model patterns highlighted at P. This combination of wood model patterns can be used to laser mark and stain a full FRP door to realistically simulate a wooden door formed from conventional wood components, as shown in FIG. 12. In one embodiment, a digital image layer may be provided, displaying outlines or puzzle pieces of the multiple wood components of a door image or other composite wood image to be marked, to facilitate construction of the full pattern. This outline layer may be removed prior to exporting the image to the laser marking apparatus. Also, wood models may be provided as larger wood grain patterns than is needed for the individual sections P of the full pattern. This allows a user or designer to select a portion of the wood model to place in the outlined section P, for even greater selective or random variability in the full pattern.

According to another aspect of the present application, a method of supplying customized laser marked products, such as, for example, laser marked FRP entry doors, may utilize a product distribution system in which an unmarked or partially marked product is supplied to one or more remote manufacturing or retail locations for laser marking either before or after the point of sale. Libraries of patterns to be laser marked (either as complete patterns, or as panels or wood model "building blocks" as described above) may be stored electronically at the remote location for programming a laser marking apparatus at that location to complete laser marking of the product. Alternatively, the libraries of patterns may be accessed from the remote location via electronic communication (e.g., via modem or the Internet), either directly to the laser marking apparatus, or to a computer or controller in communication with the laser marking apparatus. The stored patterns may be sold or licensed to the remote outlets for unlimited use, or may be restricted or limited to a "per marking" basis. By postponing final or complete laser marking of the product, the need for inventory of products with a variety of patterns or configurations may be reduced or eliminated, and the customization by an end user or retailer may be maximized.

Figure 13:
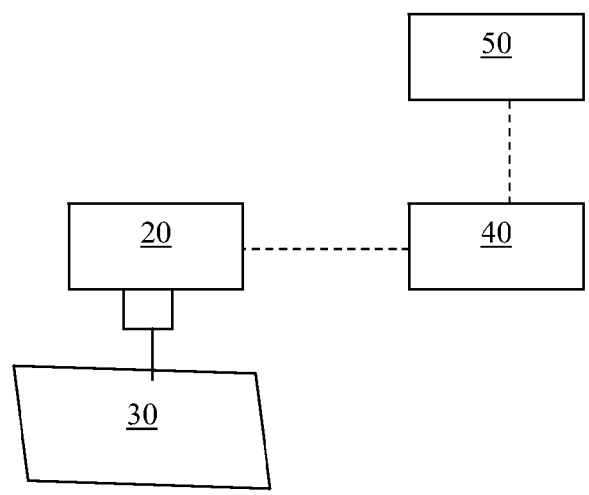
FIG. 13 is a schematic representation of a laser marking system.

FIG. 13 schematically illustrates an exemplary laser marking system 10 in accordance with the present application. The system includes a laser marking apparatus 20 configured to generate and direct a laser beam onto a work piece 30 in accordance with a computer readable code to laser mark a pattern on the work piece as instructed by the code. The computer readable code may be provided, for example, by a central computer 40 in communication with the laser marking apparatus 20 (e.g., by a wired, wireless, or Internet-based connection). Alternatively, the central computer 40 may provide information about the patterns to be marked in digital image format, with the laser marking apparatus 20 being configured to convert the image files to computer readable code. The central computer 40 may be provided with editing software for preparing the digital image files for generation of the desired laser marking. This editing software may be utilized to adjust surface marking and depth engraving portions of the pattern such that their grayscale shades represented in the digital image properly correspond to power settings of the laser marking apparatus 20 predetermined to reproduce the desired surface marking shades (immediately after marking or after some additional treatment, such as staining) and/or depth engraving. Alternatively, the digital images may be captured, modified, and stored at a different computer 50 in communication with the central computer 40 to provide the desired laser marking pattern instructions as needed.

Modification of the digital images may include, for example, separation of a digital image into two or more layers, with one layer including surface marking features having no noticeable or measurable depth, and another layer including depth engraving features having noticeable or measurable depth (for example, the wood grain "knot" features of FIGS. 9 and 10). Through the use of editing software, the grayscale shades of one layer may be isolated and adjusted while maintaining the grayscale shades of a second layer of the image. Once adjusted, these layers may be combined or re-combined to produce an adjusted grayscale image configured to communicate the proper power parameters to the laser marking apparatus for accurately reproducing the desired surface marked and depth engraved features of the pattern. This modification or editing of the digital grayscale image may be performed, for example, on any suitable desktop or laptop computer (e.g., a MAC® desktop computer) using appropriate editing software, such as ADOBE PHOTOSHOP®. In one such exemplary process, full color scan digital photographic images of wood models are imported into ADOBE PHOTOSHOP® on a MAC® desktop computer, and manipulated in PHOTOSHOP with feature grayscale target values based on the three laser marking zones identified by running the graduated grayscale grid, as described above, and subsequent smaller graduated increment grids. The resulting adjusted grayscale image is then exported from PHOTOSHOP as a raster file, such as a Tagged Image Format File (TIFF) or Bitmap. This raster image is then imported into the laser system's motion control software, which converts the raster file into a machine code that the controller then uses to define the location and relative power corresponding to each engraving pixel.

Many different types of laser systems and settings may be utilized to produce a laser marked grayscale pattern on a work piece. In an exemplary embodiment, an entry door with an FRP covering or skin is marked with a wood grain pattern using a 150 W $CO_2$ raster-style laser marking apparatus, in which one or more gantries carry one or more laser sources to be scanned or directed (e.g., by a mirror) across a work piece to be marked. One example of a laser marking apparatus for use with the systems described herein is an L-Star Laser Engraver, manufactured by Vytek. While the power setting parameters of the laser marking apparatus may vary, in one application, a laser marking apparatus utilizes a power range of 20-150 W, a spot diameter of approximately 100-500 μm or approximately 285-430 μm or about 340 μm, a pulse frequency of approximately 1-50 kHZ or approximately 6.7-38 kHz or about 10.5-18.75 kHz, a scan speed of approximately 25-150 in/sec or approximately 70-125 in/sec or about 105 in/sec, and a focal length of 1-7 inches or approximately 4-5 inches or about 5 inches. These laser marking parameters may be used to produced marked patterns having image resolutions of approximately 72-1200 dots per inch (dpi) or approximately 72-300 dpi or about 125-175 dpi.

In one application, a first laser marking zone producing no visible markings is identified as ranging from 0% to approximately 28% of the maximum power output setting, a second laser marking zone producing surface markings on the work piece is identified as ranging from approximately 28% to approximately 62% of the maximum power output setting, and a third laser marking zone producing engravings of noticeable depth is identified as ranging from approximately 85% to 100% of the maximum power output setting. In this example, laser marking using between 62% and 85% of the maximum power output produces surface marking that is not noticeably darker than that produced at 62% of the maximum power setting, while still being insufficient to produce depth engraving. As such, the 62-85% power sub-range may be excluded from the second laser marking zone. While the effective power output of the laser may be varied by adjusting any one or more of the above parameters, in an exemplary marking process, the power and pulse frequency of the laser are adjusted or modulated to provide the desired effective power output associated with each grayscale shade in the grayscale image to be marked, while maintaining a high scan speed for maximum efficiency of work piece marking.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A method of producing a pattern for use with a laser marking apparatus configured to mark visible surface markings on a work piece within a first predetermined range of power settings electronically stored on at least one computer, and further configured to engrave depth engravings on the work piece within a second predetermined range of power settings electronically stored on the at least one computer, the pattern having at least one surface marked portion and at least one depth engraved portion, the method comprising:

associating a first range of grayscale shades with the first predetermined range of power settings, such that a lightest shade in the first range of grayscale shades corresponds to a low end of the first predetermined range of power settings, and a darkest shade in the first range of grayscale shades corresponds to a high end of the first predetermined range of power settings;

associating a second range of grayscale shades with the second predetermined range of power settings, such that a lightest shade in the second range of grayscale shades corresponds to a low end of the second predetermined range of power settings, and a darkest shade in the second range of grayscale shades corresponds to a high end of the second predetermined range of power settings;

electronically storing, on the at least one computer, a digital grayscale image of the pattern to be laser marked, the digital grayscale image including a first layer including a surface marked portion of the pattern, and a second layer separable from the first layer, the second layer including a depth engraved portion of the pattern;

obtaining, on the at least one computer, a modified grayscale image in which grayscale shades of pixels in the first layer have been adjusted while maintaining grayscale shades of the second layer constant, wherein the adjusted grayscale shades of the first layer pixels that correspond to the surface marked portion of the pattern are within the first range of grayscale shades, and in which the grayscale shades of the second layer have been adjusted while maintaining the grayscale shades of the first layer constant, wherein the adjusted grayscale shades of the second layer pixels that correspond to the depth engraved portion of the pattern are within the second range of grayscale shades; and operating the laser marking apparatus at power settings associated with the adjusted grayscale shades of the first and second layers to produce the pattern on the work piece.

2. The method of claim 1, wherein the grayscale image of the pattern comprises a digital photograph of a wood grain pattern.

3. The method of claim 1, wherein the adjusted grayscale shades of the first layer comprise lightened or omitted pixels in the first layer that do not correspond to the surface marked portion of the pattern.

4. The method of claim 1, wherein the adjusted grayscale shades of the first layer comprise darkened pixels in the first layer that do not correspond to the surface marked portion of the pattern, such that the darkened pixels are within the second range of grayscale shades.

5. The method of claim 1, further comprising operating the laser marking apparatus at power settings associated with the adjusted grayscale shades of the first and second layers to produce the pattern on the work piece.

6. The method of claim 1, wherein the grayscale shades of pixels in the first layer have been adjusted by isolating the first layer from the second layer, and wherein the grayscale shades of pixels in the second layer have been adjusted by isolating the second layer from the first layer.

7. The method of claim 1, further comprising converting the modified grayscale image to a computer readable code, such that the first range of grayscale shades is associated with the first range of laser power settings, and the second range of grayscale shades is associated with the second range of laser power settings.

8. The method of claim 7, wherein operating the laser marking apparatus comprises operating the laser marking apparatus in accordance with the computer readable code.

9. The method of claim 1, further comprising operating a laser marking apparatus at graduated incremental power settings from a minimum predetermined power setting to a maximum predetermined power setting to produce a corresponding grayscale grid pattern on a test piece, and measuring relative shades of incremental locations on the grayscale grid pattern of the test piece to identify the first range of power settings and the second range of power settings.

10. The method of claim 9, further comprising applying a shade enhancing material to the grayscale grid pattern on the test piece before measuring relative shades of incremental locations on the grayscale grid pattern.

11. The method of claim 10, wherein the shade enhancing material comprises a stain.

12. The method of claim 9, further comprising excluding from the first range of power settings a sub-range of power settings over which a change in power produces no noticeable change in visible marking.

13. The method of claim 9, wherein the adjusted-grayscale shades of the first layer pixels comprise pixels in the first layer that do not correspond to the surface marked portion of the pattern that have been adjusted to correspond with a third range of power settings for which no visible markings are produced when operating the laser marking apparatus on the test piece.

14. The method of claim 1, further comprising storing, on the at least one computer, a plurality of first wood model images, each of the first wood model images including a different wood grain pattern, storing a plurality of second wood model images, each of the second wood model including a different wood grain pattern, and combining a selected one of the plurality of first wood model images for a first portion of the wood grain pattern with a selected one of the plurality of second wood model images for a second portion of a wood grain pattern to generate the digital grayscale image.

15. The method of claim 1, wherein obtaining the digital grayscale image comprises at least one of providing the digital grayscale image, generating the digital grayscale image; and receiving the digital grayscale image.

16. The method of claim 14, further comprising applying a shade enhancing material to the pattern on the work piece.

17. The method of claim 1, wherein the at least one computer comprises a plurality of computers.

18. The method of claim 1, wherein the first and second predetermined ranges of power settings are electronically stored on a first computer of the at least one computer, and the grayscale image is obtained on a second computer of the at least one computer.

19. A method of producing a pattern for use with a laser marking apparatus configured to mark visible surface markings on a work piece within a first predetermined range of power settings electronically stored on at least one computer, and further configured to engrave depth engravings on the work piece within a second predetermined range of power settings electronically stored on the at least one computer, the pattern having at least one surface marked portion and at least one depth engraved portion, the method comprising:

electronically storing, on the at least one computer, a digital grayscale image of the pattern to be laser marked, the digital grayscale image including a first layer including a surface marked portion of the pattern, and a second layer separable from the first layer, the second layer including a depth engraved portion of the pattern;

modifying, on the at least one computer, the grayscale image by adjusting grayscale shades of pixels in the first layer while maintaining grayscale shades of the second layer constant, wherein the adjusted grayscale shades of the first layer pixels that correspond to the surface marked portion of the pattern are within a first range of grayscale shades, wherein the first range of grayscale shades is associated with the first predetermined range of power settings, such that a lightest shade in the first range of grayscale shades corresponds to a low end of the first predetermined range of power settings, and a darkest shade in the first range of grayscale shades corresponds to a high end of the first predetermined range of power settings; and modifying, on the at least one computer, the grayscale image by adjusting the grayscale shades of the second layer while maintaining the grayscale shades of the first layer constant, wherein the adjusted grayscale shades of the second layer pixels that correspond to the depth engraved portion of the pattern are within a second range of grayscale shades, wherein the second range of grayscale shades is associated with the second predetermined range of power settings, such that a lightest shade in the second range of grayscale shades corresponds to a low end of the second predetermined range of power settings, and a darkest shade in the second range of grayscale shades corresponds to a high end of the second predetermined range of power settings; and exporting the modified grayscale image to the laser marking apparatus to enable the laser marking apparatus to produce the pattern on the work piece.

20. The method of claim 19, further comprising operating the laser marking apparatus at the power settings associated with the grayscale shades of the first and second layers to produce the pattern on the work piece.

21. The method of claim 20, wherein the laser marking apparatus uses a maximum power of 150 W.

22. The method of claim 20, wherein the work piece comprises fiberglass reinforced plastic.

23. The method of claim 20, further comprising operating the laser marking apparatus at non-zero power settings below the first range of power settings to laser treat non-patterned portions of the work piece.

24. The method of claim 19, wherein the grayscale image of the pattern comprises a digital photograph of a wood grain pattern.

25. The method of claim 19, wherein electronically storing the digital grayscale image of the pattern to be laser marked comprises selecting one of a plurality of first wood model images, each of the first wood model images including a different wood grain pattern, selecting one of a plurality of second wood model images, each of the second wood model including a different wood grain pattern, the digital grayscale image being generated from a combination of the selected ones of the first and second wood model images.

26. The method of claim 19, wherein electronically storing the digital grayscale image comprises at least one of providing the digital grayscale image, generating the digital grayscale image; and receiving the digital grayscale image.

27. The method of claim 19, wherein the at least one computer comprises a plurality of computers.

28. The method of claim 19, wherein the grayscale image is electronically stored on a first computer of the at least one computer, and the grayscale image is modified on a second computer of the at least one computer.

\* \* \* \* \*